United States Patent [19]
Scripter

[11] 3,930,663
[45] Jan. 6, 1976

[54] COLLAPSIBLE CARRIER FOR EQUESTRIAN SADDLE

[76] Inventor: Robert D. Scripter, 6212 E. Mescal, Scottsdale, Ariz. 85254

[22] Filed: Dec. 11, 1974

[21] Appl. No.: 531,622

Related U.S. Application Data

[63] Continuation-in-part of Ser. No. 476,900, June 6, 1974, abandoned.

[52] U.S. Cl................................. 280/36 C; 280/47.33
[51] Int. Cl.².......................................... B62B 1/20
[58] Field of Search............ 280/36 R, 36 C, 47.17, 280/47.18, 47.25, 47.33

[56] References Cited
UNITED STATES PATENTS

| | | | |
|---|---|---|---|
| 2,706,008 | 4/1955 | Voigt | 280/36 R |
| 2,957,700 | 10/1960 | Beaurline | 280/36 C |

*Primary Examiner*—Leo Friaglia
*Assistant Examiner*—Michael J. Forman
*Attorney, Agent, or Firm*—Don J. Flickinger

[57] ABSTRACT

A frame is provided with a pair of spaced ground wheels at the lower end thereof and a handle at the upper end thereof. A saddle-bearing member is pivotally mounted upon the frame to be selectively folded against the frame or, alternately, supported in a generally horizontal saddle-bearing position by a foldable strut. Foldable ground support means are also pivotally secured to the frame for cooperating with the ground wheels to support the carrier in an upright position. Seat and shade means are selectively attachable to the frame.

2 Claims, 13 Drawing Figures

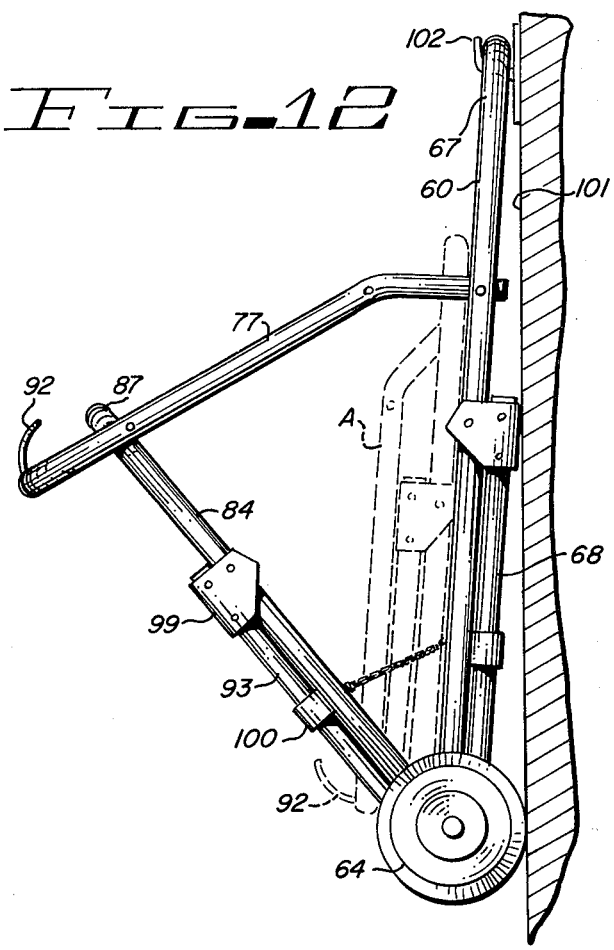
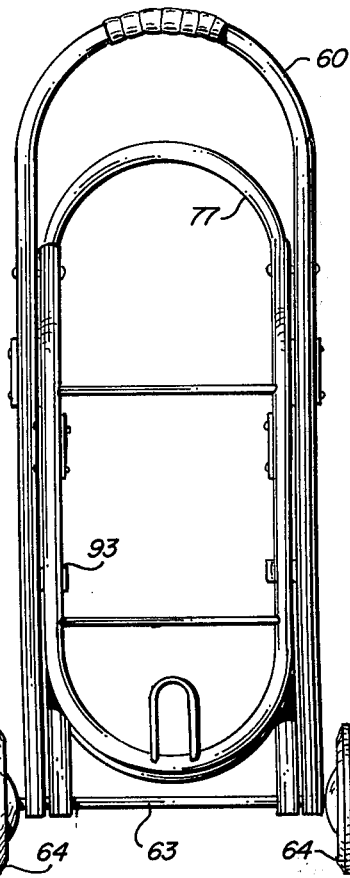
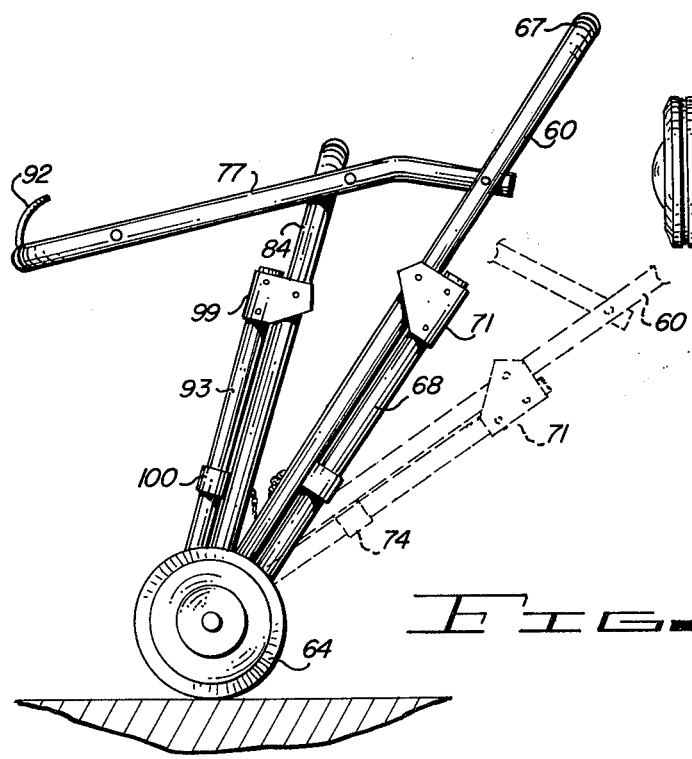

COLLAPSIBLE CARRIER FOR EQUESTRIAN SADDLE

The instant application is a continuation-in-part application of the instant inventor's copending application Ser. No. 476,900, entitled "Collapsible Carrier for Equestrian Saddle", filed June 6, 1974, now abandoned.

The invention relates to equestrian gear and riding tack.

More particularly, the invention concerns a collapsible wheeled carrier for transporting and storing an equestrian saddle.

Equestrian saddles tend to be heavy, ungainly devices. The conventional western saddle weighs in the range of 35 to 40 pounds, while silver-encrusted parade saddles range upward of 200 pounds. In addition to the weight, the saddle includes a rather large, bulky seat encumbered with long pendulant stirrups and straps.

Generally, stables are arranged such that the saddle, along with other gear and supplies, is maintained in a tack room which is remote from the horse quartering in a stall or corral. As a preliminary step in preparing to ride, the horseman carries the saddle from the tack room to the horse quarters. Since it is not desirable to set the saddle upon the ground, the horseman balances the saddle upon an appropriate rail or other object while he attends to the horse blanket, bridle and other prerequisites. At the end of the ride, the procedure is reversed, with the saddle again balanced on an improvised rest while the horse is cooled and groomed. The saddle is then carried back to the tack room.

The considerable saddle handling is an arduous task for any horseman and approaches the limit of physical ability for many women and children. Also, since adequate temporary holding facilities for the saddle are not generally readily available proximate the horse guarters, considerable inconvenience is associated with handling the saddle.

It would be highly advantageous, therefore, to provide a convenient means for holding and transporting an equestrian saddle.

Accordingly, it is a primary object of the present invention to provide a wheeled saddle carrier.

Another object of the invention is to provide a wheeled saddle carrier that is collapsible for compact stowage.

Still another object of the invention is the provision of a saddle carrier which may be used as a wall-hanging rack for stowage of a saddle.

A further object of the invention is to provide a saddle carrier which is adjustable to accommodate users of various heights.

Yet another object of the invention is the provision of a saddle carrier which will enable persons of lesser physical strength to transport a saddle.

Yet a further object of the invention is the provision of a collapsible saddle carrier which will function as a spectator seat for equestrian events when the saddle has been removed therefrom.

And still a further object of the invention is to provide a carrier of the above type which is relatively lightweight, yet durably constructed.

Briefly, to achieve the desired objectives of the present invention in accordance with a preferred embodiment thereof, first provided is a main frame member which extends upwardly rearward from the lower end thereof. A pair of spaced ground wheels pivotally carried at the lower end of the main frame member support the carrier above the ground and a handle at the upper end of the main frame provides for manual manipulation of the carrier. An elongate saddle bearer, sized and shaped to support an equestrian saddle thereon, is pivotally secured at one end thereof to the main frame member and is movable from a collapsed position against the main frame to a substantially horizontal load-bearing position. A collapsible strut member is extendable between the saddle bearer and the main frame to support the saddle bearer in a generally horizontal load-bearing position. Ground support means are pivotally secured at the upper end thereof to the main frame and are selectively movable from a collapsed position against the main frame to a downwardly rearward position for cooperating with the ground wheels to support the carrier in an upright position.

The foregoing and further and more specific objects and advantages of the present invention will become readily apparent to those skilled in the art from the following detailed description of the preferred embodiment thereof, taken in conjunction with the drawings, in which:

FIG. 11 is a side elevation view corresponding to the illustration of FIG. 10 when alternately erected;

FIG. 12 is a side elevation view of the device of FIG. 9 as it would appear when used as a wall-hanging rack for storing a saddle and having the fully collapsed position superimposed thereon in dashed outline; and FIG. 13 is a frontal view of the saddle carrier of FIG. 9 as it would appear in the fully collapsed position.

Figure 1:
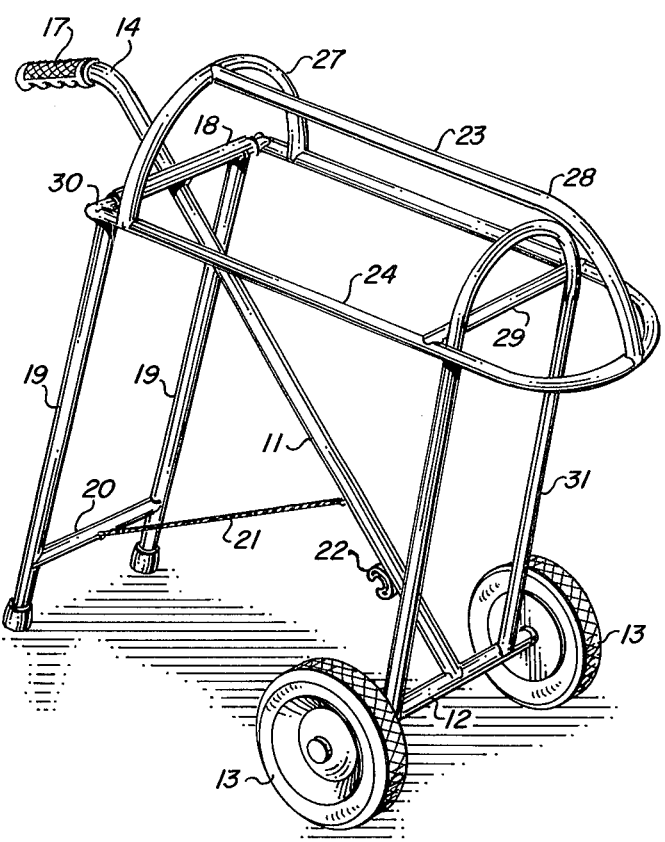
FIG. 1 is a perspective view of a collapsible equestrian saddle carrier constructed in accordance with the teachings of the present invention as it would appear when erected and ready for use.

Turning now to the drawings, in which the same reference numerals indicate corresponding elements throughout the several views, attention is first directed to FIG. 1, which shows the carrier having a main frame member, generally designated by the reference character 10. In accordance with currently preferred instruction methods, the several main components of the carrier, including the main frame 10, are weldments fabricated from tubing, especially aluminum or thin-walled steel tubing. The main frame 10 includes an elongate tubular member 11 which is longitudinal to the carrier and oblique to the ground level when the device is in the erected position. A transverse tube 12 is welded to the lower end of the elongate tube 11. Ground wheels 13 are carried at either end of the transverse tube 12. Various well known expediencies exist within the art for mounting the wheels 13 to the tube 12. In one configuration, a solid axle pivotally extends through the tube 12 with the wheels 13 secured to either end thereof. Alternately, the wheels 13 are pivotally secured directly to the tube 12 or to stub axles carried by the ends thereof.

The upper end of the elongate tube 11 is curved downward to provide a handle portion 14 for convenient manual manipulation of the carrier by the user. A handgrip 17 of the type well known in the bicycle and handtruck arts is secured to the end of the handle 14 for further convenience of the user. A second transverse tube 18 is welded to elongate tube 11 below the handle section 14. Legs 19, spaced by brace 20 proximate the lower end thereof and pivotally secured at the upper end thereof to transverse tube 18, form a ground support to cooperate with the ground wheels 13 to maintain the carrier in the upright position. The collapsibility of the carrier will be hereinafter described in detail. However, as seen in the instant view, chain 21 extends between elongate tube 11 and brace 20 to limit the pivotal movement of the legs 19 in a direction away from the main frame member 10. Spring clip 22 engages brace 20 to selectively retain the ground support against the main frame 10.

An elongate saddle bearer 23 is formed by U-shaped tube 24, a generally semicircular member 27, upstanding from proximate the rear end thereof, and a J-shaped member 28 extending forwardly from an upper portion of the semicircular member 27 and proceeding arcuately downward to the front portion of the U-shaped member 24. Brace 29 extends between the legs of the U-shaped member proximate the curved portion thereof. A shaft 30 extending through and pivotal within the transverse tube 18 is secured at either end thereof to the legs of the U-shaped member 24. U-shaped strut 31 is pivotally carried by transverse tube 12 and extends upwardly therefrom between the legs of the U-shaped member 24 to support the saddle bearer in a substantially horizontal load-bearing position. Although various means are known for pivotally attaching strut 31 to transverse tube 12, it is presently preferred that the ends of the legs of the strut 31 are welded to collars which are pivotal about the transverse tube 12. Legs 19 may be similarly attached to transverse tube 18.

Figure 2:
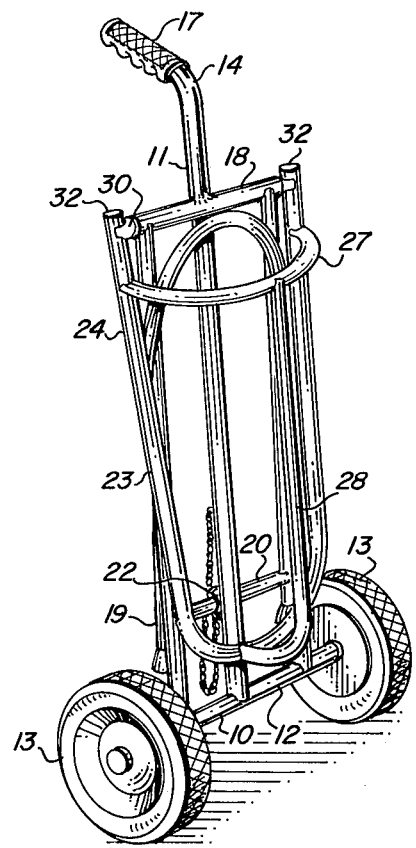
FIG. 2 is a perspective view of the saddle carrier of FIG. 1 as it would appear when collapsed and ready for storage.

For compact stowage, the carrier, as illustrated in FIG. 1, collapsible to the configuration shown in FIG. 2. Strut 31 is folded against main frame 10 such that the curved portion of the U rests against the elongate tube 11 below transverse tube 18. Saddle bearer 23 is pivoted downwardly with U-shaped member 24 abutting elongate tube 11. The ground support is pivoted against main frame 10 to engage brace 20 within spring clip 22, providing a package in which main frame 10, legs 19, strut 31 and U-shaped member 24 are mutually abutted and lie substantially within the same plane. It is particularly noted herein that the legs of U-shaped member 24 have identical exposed open ends 32. The sequential erection of the collapsed carrier, as well as the significance of the open ends 32, will be hereinafter described in detail.

Figure 3:
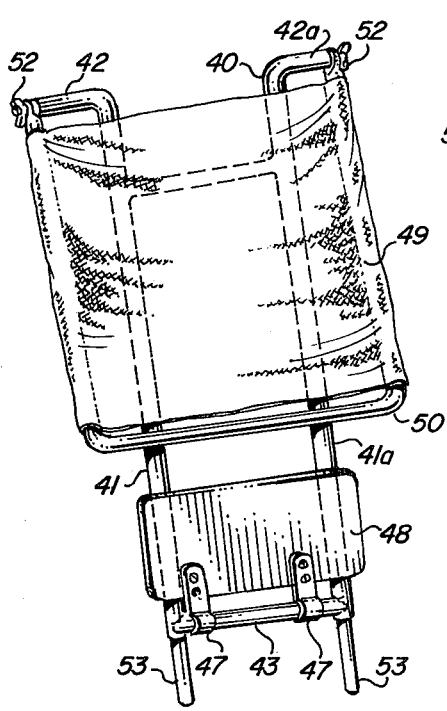
FIG. 3 is a perspective view of an accessory device for use in connection with the carrier of FIG. 1 as the device would appear in the folded storage position.
Figure 4:
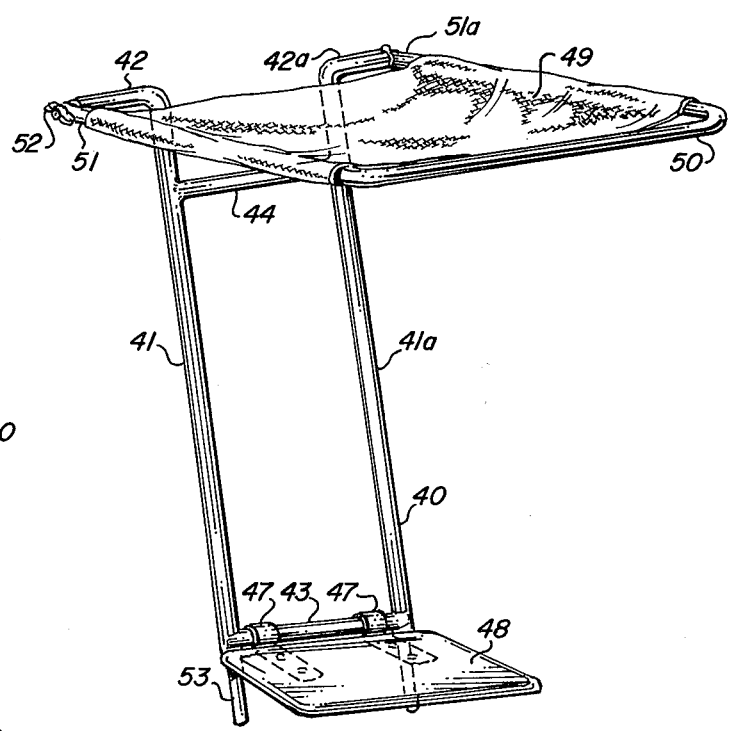
FIG. 4 is a perspective view illustrating the device of FIG. 3 in the unfolded position.
Figure 5:
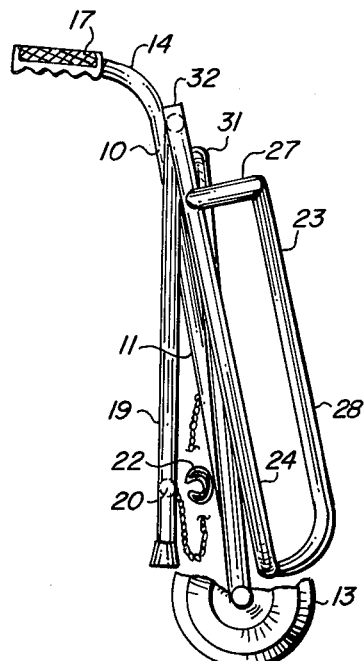
FIG. 5 is a side elevation view of the device of the present invention corresponding to the illustration of FIG. 2 and showing further details thereof.
Figure 6:
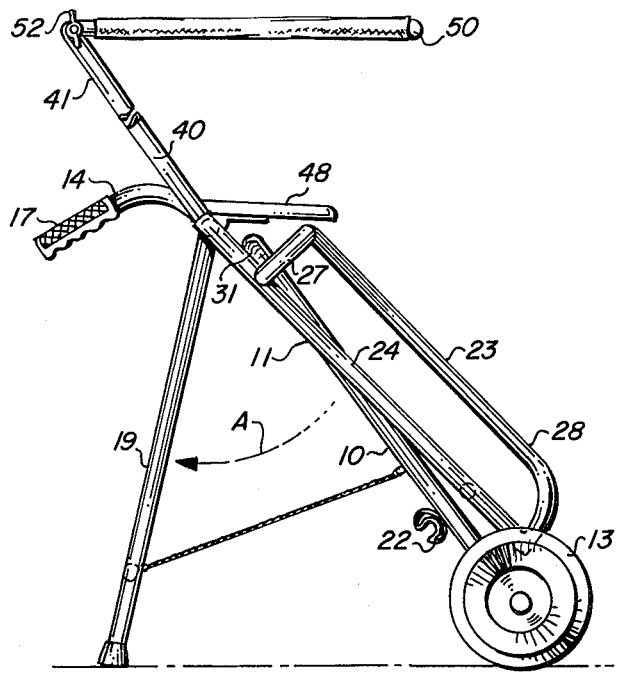
FIG. 6 is a side elevation view corresponding to the illustration of FIG. 5 at an initial stage of unfolding the device from the collapsible position to the erected position.

FIGS. 3 and 4 illustrate a combination seat-sunshade accessory for use with the saddle carrier of the present invention.

An upright support frame, generally designated by the reference character 40, is formed by a pair of parallel elongate tubes 41 and 41a having outturned projections 42 and 42a at the upper end thereof. Brace members 43 and 44 extend between the elongate tubes 41 and 41a and are welded thereto. Brackets 47, pivotal about the brace 43, carry seat means 48. Fabric 49 carried by generally U-shaped member 50 provides a sunshade over seat means 48. Legs 51 and 51a are pivotally connected to the ends of projections 42 and 42a, respectively. Each pivotal connection includes a wing nut 52 whereby the angle between the U-shaped member 50 and the upright frame 40 is selectively adjustable. As particularly noted in FIG. 3, seat means 48 and frame member 50 have been folded against the upright frame 40 to complement the compact stowage of the carrier. In FIG. 4, the sunshade is shown in the extended position. A rod 53 extends from the lower end of each elongate tube 41 and 41a. The rod 53 is sized to be inserted into the open ends 32 of the U-shaped member 24 to support the seat means and sunshade in a manner and position as will be described presently.

FIGS. 5-8 illustrate the sequential operations in erecting the saddle carrier of the present invention from the collapsed position. The illustration of FIG. 5 essentially corresponds to the fully collapsed position, as seen in FIG. 2, except that the brace 20 has been disengaged from the clip 22 as the initiation of the intermediate step which is shown as completed in FIG. 6. Herein, the legs 19 have been pivoted in the direction of the arrow A to the extent of travel permitted by chain 21 which places the carrier into a free-standing configuration. In the free-standing configuration, the carrier, in combination with the attachment as illustrated in FIGS. 3 and 4, also functions as a seat and shade means whereby an observer, such as a trainer, may observe the horse and rider after the saddle has been removed from the carrier and placed upon the horse. The accessory device is attached when rods 53 are inserted into the exposed open ends 32 with the lower ends of the elongate tubes 41 and 41a abutting the respective ends of the legs of the U-shaped member 24. Seat means 48 is supported in a substantially horizontal position by the aforementioned pivotal attachment to brace 43 and extending foward therefrom to rest upon semicircular member 27.

Figure 7:
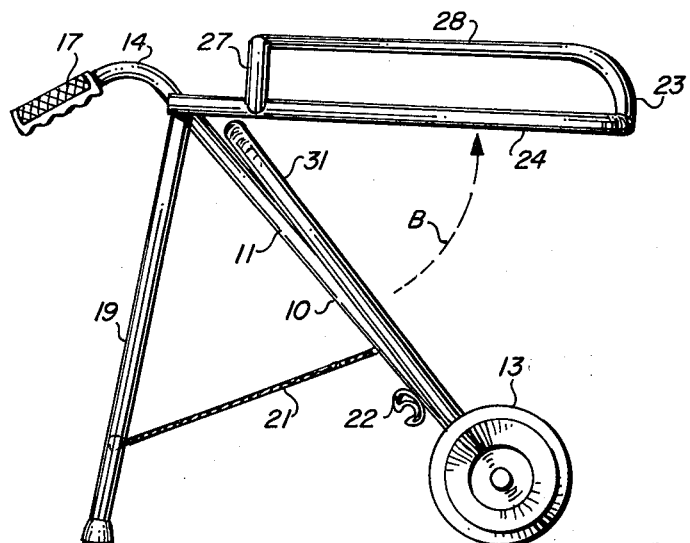
FIG. 7 is a side elevation view corresponding to the illustration of FIG. 6 at a subsequent stage of erection thereof.
Figure 8:
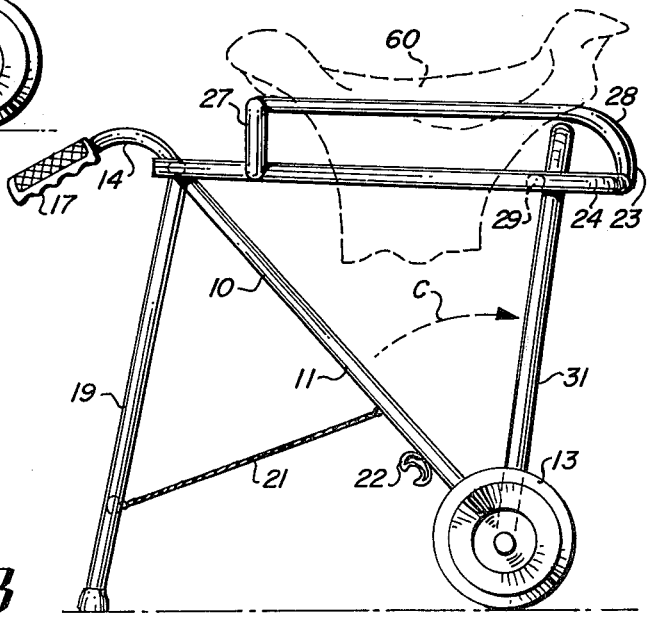
FIG. 8 is a side elevation view corresponding to the illustration of FIG. 6, but in the fully erected position.

After the saddle bearer 23 has been pivotted upward in the direction of the arrow B, as seen in FIG. 7, strut member 31 is pivoted forward in the direction of the arrow C, as illustrated in FIG. 8. Subsequently, the saddle bearer 23 is lowered to rest upon strut 31. As specifically noted in FIG. 8, the J-shaped member 28 does not rest upon the strut 31. The distance across the outside of the legs of strut 31 is slightly larger than the distance across the inside of the legs of U-shaped member 24. Thus, when the U-shaped member 24 is lowered over strut 31, a frictional engagement is made therebetween near the maximum width part of the curved end of the strut 31. This frictional arrangement permits the carrier to be lifted by the J-shaped member 28 or any other part of the saddle bearer 23, if necessary. An equestrian saddle is shown in the dashed outline 60 in FIG. 8 to illustrate the relative placement thereof upon the saddle bearer 23.

An alternate embodiment of a collapsible saddle carrier constructed in accordance with the teachings of the present invention is illustrated in FIGS. 9–13. As particularly seen in FIG. 9, the instant embodiment includes a generally U-shaped main frame member 60 having elongate legs 61 and 62 extending longitudinal to the carrier. Axle 63 proximate the ends of legs 61 and 62 has a ground wheel 64 pivotally secured at either end thereof. The upper curved section 67 of main frame member 60 forms a handle for the carrier and is preferably provided with a grip. The grip preferably herein illustrated in a leather strap spirally wrapped along a portion of curved section 67.

Ground support means 68 support main frame member 60 at an oblique angle extending from the lower wheeled end upwardly rearward to the upper handled end. Ground support 68 is a generally U-shaped member having upwardly extending legs 69 and 70 which are pivotally secured at the upper ends thereof to main frame 60 intermediate the upper and lower ends thereof. The pivotal attachment is accomplished by a U-shaped bracket 71 rigidly affixed to legs 69 and 70 by rivets 72 and pivotally secured to legs 61 and 62 by pins 73. In the collapsed position, leg 69 is juxtaposed with legs 61 and leg 70 lies against leg 72 and are retained by spring clips 74 secured to legs 61 and 62 and detachably engaging legs 69 and 70, respectively. As ground support 68 is rotated downwardly rearward from main frame 60, the upper ends of legs 69 and 70 abut, respectively, legs 61 and 62 of main frame 60 to retard further rearward movement of ground support 68 and maintain the carrier in an upright position.

Saddle bearer 77 of the instant invention is a generally U-shaped member having a forward curved section 78 and rearwardly extending legs 79 and 80 which are pivotally secured at the free ends thereof to legs 61 and 62, respectively, of main frame member 60 by pivot pins 81. Forward and rearward brace members 82 and 83, respectively, extend between legs 79 and 80. A strut 84, having an upward curved section 87 and downwardly depending legs 88 and 89, maintains saddle bearer 80 in the load-bearing position. The lower end of strut 84 is pivotally secured to the lower end of main frame 60. To simplify construction, the lower end of legs 61, 62, 88 and 89 are aligned and drilled to receive axle 63 therethrough.

Strut 84 is foldable rearward against main frame 60 to place the carrier in a collapsed position. Saddle bearer 77 complements the collapsed position by folding downwardly to overlie strut 84. Chains 90, extending between legs 61 and 88 and 62 and 89, respectively, simplify erection from the collapsed position to the upright position by retarding the forward movement of strut 84.

Figure 9:
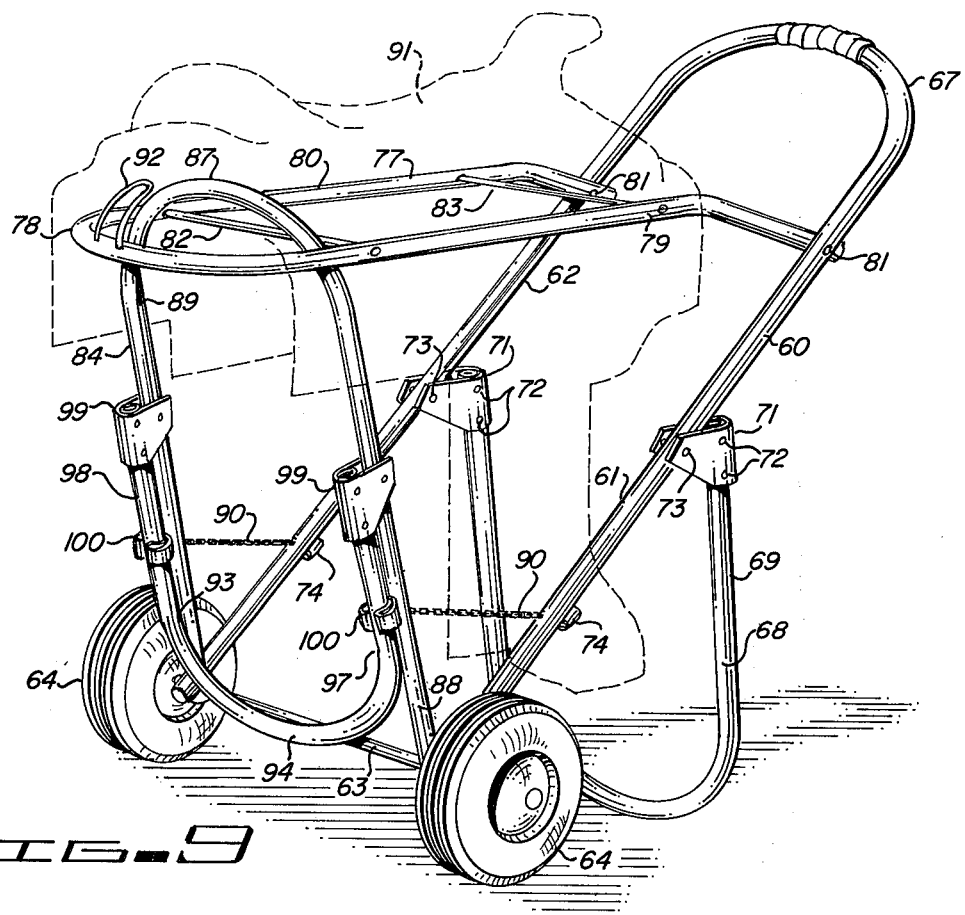
FIG. 9 is a perspective view of an alternately preferred embodiment of the collapsible equestrian saddle carrier of the present invention as it would appear in the erected upright position.

As particularly seen in FIG. 9, saddle bearer 77 rests in a generally horizontal position upon strut 84 with the upper curved end 87 thereof positioned between curved end 78 of saddle bearer 77 and brace 82. An alternate placement will be hereinafter described. A saddle 91 is shown in dashed outline as it would appear when placed upon saddle bearer 77. Saddles, as will be readily understood by those skilled in the art, are fabricated from a frame encased in several layers of leather over other material. The manufacture thereof results in a pair of spaced longitudinal indentations on the underside of the saddle. In accordance with the instant invention, legs 79 and 80 of saddle bearer 77 are spaced to have the indentations of the saddle placed thereover for stability of the saddle upon the carrier during transportation. Saddle 91 is further retained from sliding off saddle bearer 77 by saddle retainer 92. Saddle retainer 92 projects upwardly rearward from the forward curved section 78 of saddle bearer 77 to engage over the edge of the saddle.

An auxiliary ground support member 93 having a lower curved section 94 and upwardly extending legs 97 and 98 is pivotally secured to strut 84. Brackets 99, similar to the brackets 71 hereinbefore described, effect the securement. In the collapsed position, auxiliary ground support 93 is folded against strut 84 and retained by spring clips 100 secured to legs 88 and 89 and engaging, respectively, legs 97 and 98.

Figure 10:
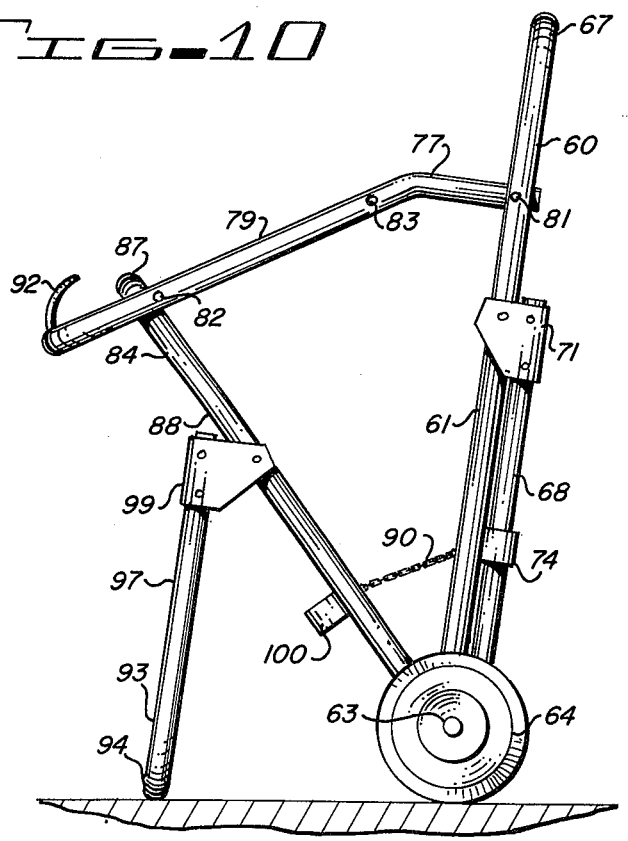
FIG. 10 is a side elevation view of the alternate embodiment of FIG. 9 as it would appear when supported by auxiliary ground support means.

FIG. 10 illustrates the saddle carrier of FIG. 9 as it would appear in an alternately erected position especially adapted for loading and unloading a saddle by a person of lesser physical stature. Strut 84 is engaged with saddle bearer 77 such that the upper end 87 of strut 84 extends between legs 79 and 80 immediately forward of brace 83. Ground support 68 is folded against main frame 60 and retained by spring clips 74. Auxiliary ground support 93 has been disengaged from spring clips 100 to extend forwardly from strut 84 and cooperate with wheels 64 to retain the carrier in the upright position. A saddle is maintained upon the sloping saddle bearer 77 by saddle retainer 92.

As seen in FIG. 11, the saddle carrier in the configuration of FIG. 10 presents a handle 67 which is substantially lower than the handle as illustrated in FIG. 9 due to the more accute angle of main frame member 60 to the ground. As the saddle carrier is moved from the rest position of FIG. 10 to the transportation position of FIG. 11, the handle is simply grasped and pulled to the rear. It is not necessary to first fold auxiliary ground support 93, as previously noted, since urging handle 67 rearwardly immediately raises lower end 97 of auxiliary support 93 from the ground.

As is clearly illustrated in FIG. 12, the equestrian saddle carrier of the instant invention is readily adaptable for compact storage. In the immediate illustration, 101 represents the wall of a tack room or similar structure having a conventional hanger hook 102 projecting therefrom. As seen in the solid outline, the carrier is hung upon hook 102 by handle 67. As seen in the solid line illustration, the carrier when partially erected can support a saddle in the hanging position. When fully collapsed, as noted by the dashed outline generally designated by the reference character A, the carrier presents a slim profile which projects from wall 101 not substantially more than the diameter of ground wheel 64. FIG. 13 further illustrates the saddle carrier in the fully collapsed position as it would appear from the front.

Various changes and modifications to the embodiments herein chosen for purposes of illustration will readily occur to those skilled in the art. For example, with reference to the embodiment of FIGS. 1–8, to achieve stability a combination of either two legs and one wheel or two wheels and one leg is sufficient. It is also noted that the frictional engagement between the strut 31 and U-shaped member 24, although a highly desirable feature, is not mandatory for the function for which the carrier is intended. The J-shaped member 28 may rest upon the strut 31 and the strut subsequently retarded from rearward movement by brace 29 and from forward movement by the narrowing due to the curved end of either the J-shaped member 28 or the U-shaped member 24. With reference to the embodiment as illustrated in FIGS. 9–13, main frame 60, ground support 68, saddle bearer 77, strut 84 and auxiliary ground support 93 are each described and illustrated as a generally U-shaped member. For simplicity of manufacture, each element includes a congruent curved section with the primary difference therein being the length of the respective legs. Alternately, however, it is recognized that various features of the two embodiments are readily interchangeable. For example, the embodiment of FIGS. 9–13 may incorporate the single handle and double leg as illustrated in the embodiment of FIGS. 1–8, while that embodiment may utilize the ground support or saddle bearer of the embodiment of FIGS. 9–13.

The particular saddle bearer configurations as herein illustrated were particularly chosen as being lightweight and relatively simple to fabricate in accordance with the primary objectives of the present invention. However, various other configurations which will adequately support an equestrian saddle are readily apparent.

Having fully disclosed and described the present invention and the preferred embodiments thereof in such clear and concise terms as to enable those skilled in the art to understand and practice the same, the invention claimed is;

I claim:

1. A collapsible wheeled carrier for transporting an equestrian saddle, said carrier comprising:
   a. a main frame member extending upwardly rearward from the lower end thereof toward the upper end thereof and having
      i. a pair of spaced ground wheels pivotally carried by the lower end of said main frame for supporting said carrier above the ground, and
      ii. a handle at the upper end of said main frame for manual manipulation of said carrier;
   b. ground support means pivotally secured at the upper end thereof to said main frame intermediate the upper and lower ends thereof,
      said ground support being selectively movable from a collapsed position against said main frame to a downwardly rearward position for cooperating with said ground wheels to support said carrier in an upright position;
   c. an elongate saddle bearer, sized and shaped to receive an equestrian saddle thereon, pivotally secured at one end thereof to said main frame intermediate the upper and lower ends thereof, said saddle bearer being pivotally movable from a collapsed position against said main frame to a substantially horizontal load-bearing position; and
   d. a strut extending between said main frame at the lower end thereof and said saddle bearer at the upper end thereof for supporting said saddle bearer in said load-bearing position and being alternately collapsible against said main frame member.

2. The carrier of claim 1, further including auxiliary ground support means pivotally secured at the upper end thereof to said strut and being selectively movable from a collapsed position against said strut to a downwardly forward position for cooperating with said ground wheels to support said carrier in an upright position.

* * * * *